United States Patent
Breslow et al.

(10) Patent No.: US 10,037,267 B2
(45) Date of Patent: Jul. 31, 2018

(54) INSTRUCTION SET ARCHITECTURE AND SOFTWARE SUPPORT FOR REGISTER STATE MIGRATION

(71) Applicant: Advanced Micro Devices, Inc., Sunnyvale, CA (US)

(72) Inventors: Alexander D. Breslow, Sunnyvale, CA (US); Nuwan S. Jayasena, Sunnyvale, CA (US); Dong Ping Zhang, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/299,990

(22) Filed: Oct. 21, 2016

(65) Prior Publication Data

US 2018/0113797 A1    Apr. 26, 2018

(51) Int. Cl.
*G06F 9/45* (2006.01)
*G06F 11/36* (2006.01)
*G06F 8/71* (2018.01)
*G06F 9/30* (2018.01)

(52) U.S. Cl.
CPC ............ *G06F 11/3688* (2013.01); *G06F 8/71* (2013.01); *G06F 9/30101* (2013.01)

(58) Field of Classification Search
None
See application file for complete search history.

(56) References Cited

U.S. PATENT DOCUMENTS

2014/0344425 A1* 11/2014 Varney ............... H04L 41/0813
709/221

OTHER PUBLICATIONS

Bauer, et al., "Legion: Expressing Locality and Independence with Logical Regions", GPU Technology Conference, 2012, 1 page, http://developer.download.nvidia.com/GTC/PDF/GTC2012/Posters/P0535_Legion_GTC_2012.pdf. [Retrieved Jul. 13, 2017].

Birrell, et al., "Implementing Remote Procedure Calls", ACM Transactions on Computer Systems, Feb. 1984, pp. 39-59, vol. 2, No. 1, ACM, New York, NY, USA.

Engler, et al., "Exokernel: An Operating System Architecture for Application-Level Resource Management", Proceedings of the Fifteenth ACM Symposium on Operating Systems Principles, Dec. 3, 1995, 16 pages, ACM, New York, NY, USA.

(Continued)

*Primary Examiner* — Chuck Kendall
(74) *Attorney, Agent, or Firm* — Rory D. Rankin; Meyertons, Hood, Kivlin, Kowert & Goetzel, P.C.

(57) ABSTRACT

Systems, apparatuses, and methods for migrating execution contexts are disclosed. A system includes a plurality of processing units and memory devices. The system is configured to execute any number of software applications. The system is configured to detect, within a first software application, a primitive for migrating at least a portion of the execution context of a source processing unit to a target processing unit, wherein the primitive includes one or more instructions. The execution context includes a plurality of registers. A first processing unit is configured to execute the one or more instructions of the primitive to cause a portion of an execution context of the first processing unit to be migrated to a second processing unit. In one embodiment, executing the primitive instruction(s) causes an instruction pointer value, with an optional offset value, to be sent to the second processing unit.

20 Claims, 9 Drawing Sheets

(56) References Cited

OTHER PUBLICATIONS

Hall, et al., "Mapping Irregular Applications to DIVA, a PIM-based Data-Intensive Architecture", Proceedings of the 1999 ACM/IEEE conference on Supercomputing, Jan. 1999, 18 pages, ACM, New York, NY, USA.

Kale, et al., "Charm++: A Portable Concurrent Object Oriented System Based on C++", Proceedings of the 8th Annual Conference on Object-Oriented Programming Systems, Languages, and Applications, Oct. 1993, 18 pages, ACM, New York, NY, USA.

Kamruzzaman, et al., "Inter-core Prefetching for Multicore Processors Using Migrating Helper Threads", Proceedings of the Sixteenth International Conference on Architectural Support for Programming Languages and Operating Systems, Mar. 5, 2011, pp. 393-404, ACM, New York, NY, USA.

Lis, et al., "The Execution Migration Machine", MIT CSAIL CSG Technical Memo 511, Aug. 2013, 13 pages, http://csg.csail.mit.edu/pubs/memos/Memo-511/memo511.pdf. [Retrieved Jul. 13, 2017].

Nishtala, et al., "Scaling Communication-Intensive Applications on BlueGene/P Using One-Sided Communication and Overlap", Proceedings of the 2009 IEEE International Symposium on Parallel & Distributed Processing, May 23, 2009, pp. 1-12, IEEE Computer Society, Washington, D.C., USA.

"Chapter 5: One-Sided Communication", Sun HPC ClusterTools™ 6 Software Performance Guide, 2006, 16 pages, Sun Microsystems, Inc., https://docs.oracle.com/cd/E19061-01/hpc.cluster6/819-4134-10/1-sided.html#pgfld-999130. [Retrieved Jul. 13, 2017].

Von Eicken, et al., "Active Messages: a Mechanism for Integrated Communication and Computation", Proceedings of the 19th Annual International Symposium on Computer Architecture, May 1992, 20 pages, ACM, New York, NY, USA.

Zaharia, et al., "Delay Scheduling: A Simple Technique for Achieving Locality and Fairness in Cluster Scheduling", Proceedings of the 5th European Conference on Computer Systems, 14 pages, ACM, New York, NY, USA.

\* cited by examiner

INSTRUCTION SET ARCHITECTURE AND SOFTWARE SUPPORT FOR REGISTER STATE MIGRATION

BACKGROUND

Description of the Related Art

As multicore processors scale out, the cost of providing coherence between cores grows, with an increase in directory size per core and bandwidth required for coherence traffic, with associated increases in area and power costs for directories, as well as contention between coherence traffic and other data movement. Additionally, increasing amounts of die logic are implemented to manage coherence between remote caches. While the advancement of processor technology has rapidly increased computational capabilities, improvements in bandwidth and latency to off-chip or off-die or other non-local memory have not kept up. Furthermore, an increasing proportion of power in computing systems is being spent on data movement, especially non-local memory accesses. These problems are exacerbated for emerging workloads that exhibit memory intensive behaviors with irregular access patterns and limited data reuse. Data movement overheads are often a limiting factor in computing systems, from both performance and power perspectives.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for providing software support for register state migration are disclosed. In one embodiment, a set of instruction set architecture (ISA) extensions are utilized to permit register migration with one-to-one, one-to-many, many-to-one, many-to-many, all-to-one, one-to-all, many-to-all, all-to-many, and all-to-all semantics. In another embodiment, a set of ISA extensions are utilized to migrate a subset of registers. In a further embodiment, a set of ISA extensions are utilized to migrate only a fraction of the width of each register. In a still further embodiment, a set of ISA extensions are utilized to migrate a subset of registers but a different instruction pointer value. In a still further embodiment, a set of ISA extensions are utilized to enable continuous streaming of all or part of each or a subset of registers to a remote core. It is noted that any of the above embodiments can be combined together in a single embodiment.

In one embodiment, a system includes a plurality of processing units and a plurality of memory devices. The system is configured to execute any number of software applications. The system is configured to detect, within a first software application, a primitive for migrating at least a portion of the execution context of a source processing unit to a target execution context of a second processing unit, wherein the primitive includes one or more instructions. A first processing unit is configured to execute the one or more instructions of the primitive to cause a portion of an execution context of the first processing unit to be migrated to a second processing unit. In one embodiment, the selected portion of the execution context being migrated includes one or more registers. In such an embodiment, there will be a migration of registers without performing a write-back to a cache followed by a read from the cache.

In one embodiment, the execution context includes a plurality of registers. In one embodiment, executing the one or more instructions of the primitive causes an instruction pointer value to be sent to the second processing unit and any other processing units. The primitive can also specify an offset to apply to the instruction pointer value. In one embodiment, the primitive specifies a mask value, with the mask value indicating which subset of registers are to be migrated to the second processing unit and any other processing units. In one embodiment, the mask value is specified as part of an instruction. In another embodiment, the mask value is specified in a register. As used herein, the term "mask" can be defined as any method or mechanism that determines the subset of registers that are migrated. For example, a mask can be an implementation of a function that maps from one domain to another. A mask can specify which registers are being migrated, the sources and destinations, what parts of a register are migrated, hardware permissions for migration to different domains, etc. The actual implementation of a mask can include multiple independent masks stored in separate registers, a set of state machines, or another mechanism. Numerous such embodiments are possible and are contemplated.

In one embodiment, the primitive specifies whether the execution context of the first processing unit is to preempt an execution context of the second processing unit. Additionally, the second processing unit is configured to determine if the first processing unit is allowed to preempt the execution context of the second processing unit. In one embodiment, the first processing unit is configured to determine an amount of the execution context to migrate to the second processing unit based on energy-delay product (EDP), throughput, energy metrics, derived performance metrics, service level agreements, and service level objectives.

Register state migration between hardware execution contexts can ameliorate the previously mentioned challenges by providing lightweight hardware primitives for moving computation to the data. Through these innovations, data movement between computing elements can be reduced, often improving performance and reducing energy. Applications of these primitives include fast remote procedure calls, active messages, and performance analysis and debugging from a remote core.

Figure 1:
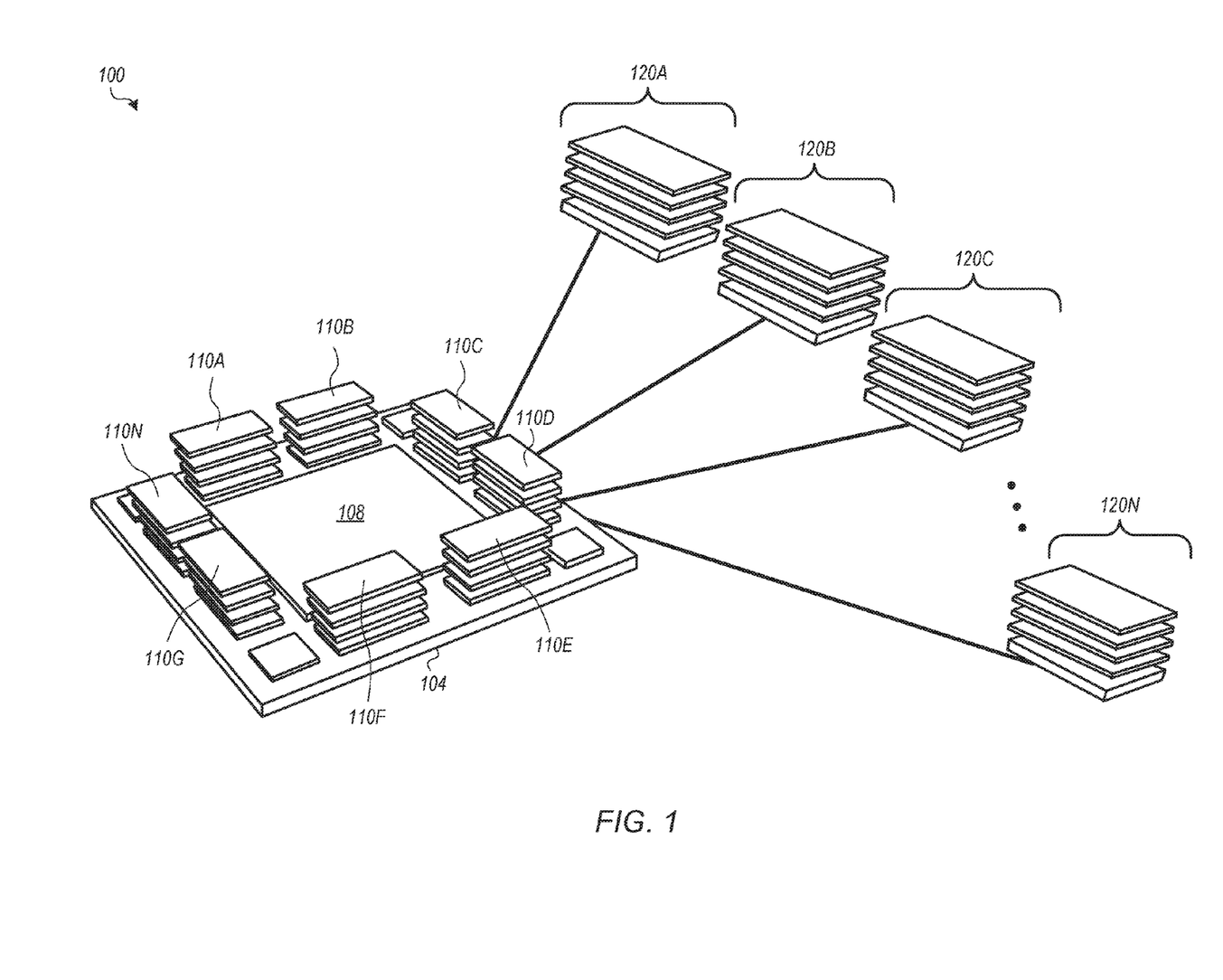
FIG. 1 is a block diagram of one embodiment of a computing system.

Referring now to FIG. 1, a block diagram of one embodiment of a computing system 100 is shown. In one embodiment, computer system 100 includes an accelerated processing unit (APU) 108 and a plurality of compute stacks 110A-N on a substrate 104 and a plurality of compute stacks 120A-N coupled to substrate 104. In one embodiment, the memory layers of 110 compute stacks 110A-N and compute stacks 120A-N are implemented as die-stacked dynamic random-access memory (DRAM). In other embodiments, system 100 can include other components in other types of arrangements.

In one embodiment, APU 108 includes one or more central processing units (CPUs). APU 108 can also include one or more graphics processing units (GPUs). The processors of APU 108 are configured to execute the main control software of system 100, such as an operating system. Generally, software executed by the processors of APU 108 during use can control the other components of system 100 to realize the desired functionality of system 100. The processors of APU 108 can also execute other software, such as application programs. The application programs can provide user functionality, and can rely on the operating system for lower level device control.

In one embodiment, an execution context is migrated from one or more processing units of system 100 to one or more other processing units of system 100. It is noted that the terms "processing unit" and "core" can be used interchangeably herein. In some embodiments, an execution context is migrated within the same processing unit of system 100, wherein the migration occurs from a first execution context of a given processing unit to a second execution context of the given processing unit.

In one embodiment, the migration of an execution context is specified in a software primitive that is expressed in the executable instructions of a software application. Depending on the embodiment, the software primitive can be user-generated, indicated by a user-hint, compiler-generated, or a combination thereof. As used herein, the term "primitive" is defined as one or more software instructions or descriptors that are ultimately assembled or compiled into architectural instructions. In one embodiment, primitives are implemented as source code of a high-level language. In another embodiment, primitives are implemented as assembly code. In some cases, a primitive invokes a software library or other OS-independent mechanism for causing migration of execution context(s) between processing units. In some embodiments, there are several levels of abstraction between a programmer's code and actual architectural instructions that cause migration of execution context(s). In some cases, an instruction is further decoded by an execution unit into one or micro-operations.

In multiprocessor systems, a common practice is to bring the data to the computation rather than computation to the data. However, migrating software threads and associated registers to a remote core closer to where the data is stored has the potential to improve performance and reduce energy consumption. In one embodiment, a number of software primitives are utilized to support hardware-based register migration to enable further performance and energy efficiency optimizations for system 100 as well as serve as the foundation for the creation of new programming models that incorporate full and partial register state and thread migration. These primitives include support for unicast, multicast, and broadcast, and other common communication patterns for quick exchange of information. For example, a primitive can specify if a migration is a unicast, multicast, or broadcast migration via the specification of one or more destination contexts or a special encoding that indicates a migration to all available hardware contexts. Additionally, software directed migration of registers can be performed such that the amount of state transferred during a migration can be optimized subject to one or more metrics, such as energy-delay product (EDP), throughput, energy, etc.

In one embodiment, instruction set architecture (ISA) support for register migration is implemented to enable fast migration of threads and register data between cores at the software-level. Additionally, compilers, libraries, applications, and online runtime systems and code optimizers can be utilized to optimize movement of computation to data within a broad range of architectures in addition to the architecture shown in FIG. 1. Examples of other architectures are described in further detail below in the discussion associated with FIGS. 2-3. The ISA extensions allow for a diverse set of migration policies to be implemented on these and other types of architectures.

In one embodiment, software support for register migration is extended to support program analysis by streaming register values to a remote execution context and performing analysis on a remote core. For example, in this embodiment, data is streamed from a first processing unit to a remote thread on a remote processing unit, with the remote thread performing light-weight profiling. The first processing unit can collect performance counter values and then these values are streamed to the remote thread. The remote thread could then perform an analysis on the performance counter data and write the output of the analysis to a log file. Further, the remote thread could leverage the received streamed register values to optimize for performance, energy efficiency, or another metric with or without intervention from the profiled code.

Generally speaking, new instructions can be added to the ISA that allow for all or a subset of the registers used by a single thread to be unicast, multicast, or broadcast to a set of other execution contexts with the flexibility to preempt or not to preempt any remotely running thread. Adding such functionality can be implemented to allow for a compiler, interpreter or an online, adaptive, code rewriting system to optimize for performance and energy by co-managing movement of computation and data. This functionality can also be managed by the operating system.

In one embodiment, a set of ISA extensions are implemented to permit register migration with one-to-one, one-to-many, many-to-one, many-to-many, all-to-one, one-to-all, many-to-all, all-to-many, and all-to-all semantics. In one embodiment, a unicast primitive is used to migrate a thread to a remote execution context. All or part of the general purpose registers, instruction pointer, and other architectural state can be copied to the remote execution context. In another embodiment, a multicast primitive is used for single program multiple data (SPMD) semantics. In this embodiment, a thread is migrated and copied to multiple remote execution contexts and loads and operates on a different set of data at each processing unit.

In one embodiment, a set of ISA extensions are implemented to migrate a subset of registers of an execution context. In one embodiment, the compiler specifies which subset of the registers are to be migrated to the remote context based on the utilization of registers known to the compiler. In some cases, the compiler determines that only a subset of the registers should be migrated for security and energy efficiency reasons.

In one embodiment, a set of ISA extensions are implemented to migrate only a fraction of the width of each register (e.g., 16 bits of a 64 bit register). For example, accesses can be performed that do not fill an entire register. Alternatively, different subsets of bits of a register can be migrated to different destination registers at potentially different offsets. In some embodiments, registers contain a mix of public and private data, and instructions support migrating only a subset of the register corresponding to the public data.

In one embodiment, a set of ISA extensions are implemented to migrate a subset of registers but with a different instruction pointer value. This migration supports triggering one or many remote procedure calls (RPCs) or active messages (AMs). An RPC includes a function pointer or reference and a set of arguments or references to data. An AM contains an address or reference to a code segment that dequeues work into an existent computation on a destination processing unit. An RPC or AM can additionally contain the code segment.

In one embodiment, migrating a subset of registers but with a different instruction pointer value enables the creation of low-weight, short threads that can be spawned on remote cores. For example, finer grain pipeline parallelism can be implemented and helper threads can be spawned. Additionally, in another embodiment, fast data exchange between threads is enabled or leveraging more of the fast memory is enabled when the processor traditionally would be underutilized.

In one embodiment, multiple instruction single data (MISD) computations are supported by migrating a subset of registers but with a different instruction pointer value. The initial register state can hold the data to be operated on. Such computations occur frequently in pattern matching applications, which can be performed during network packet processing, malware detection, and regular expression search. In the case of regular expressions, different regular expressions can be run on different cores on the same data.

In one embodiment, a set of ISA extensions are implemented to enable continuous streaming of all or part of each or a subset of registers to a remote core. The capability to set up continuous streaming can enable light-weight debuggers and performance introspection software to be utilized. The ISA extensions can include support for starting and stopping streaming, specifying a location for the streaming to write to (registers, memory location, hardware structures), and specifying a sample interval from the streamed registers. Generally speaking, a set of ISA extensions can be implemented that mix and match any subset of the prior features together, thus permitting fast, software-directed thread state migration, and generalized register migration in a broad range of environments including but not limited to CPUs, GPUs, field programmable gate arrays (FPGAs), application specific integrated circuits (ASICs), and digital signal processors (DSPs).

In one embodiment, one technique for enabling migration is by setting control registers that describe the migration operation via standard store instructions. In one embodiment, multiple control registers are used. For instance, part of a register, one register, or more than one register can be used to encode each of the following items and to trigger the migration operation:

1. Communication type, e.g. one-to-one, one-to-all, many-to-one, etc.
2. Destinations and sources
3. The set of registers to be migrated
4. How much of each register is to be migrated
5. Whether the migration is preemptive or non-preemptive
6. An offset to the instruction pointer value
7. The instruction pointer value of choice In another embodiment, migration is supported by the addition of instructions to the ISA. These instructions can encode the aforementioned points, which can be addressed as specific hardware instructions. For example, the following encodings can be supported in the new instructions:

1. The communication type could be encoded by the instruction opcode (e.g., one-to-one, many-to-one) or by having a field specify the type. For instance, a single generic instruction can be implemented for exchanging registers that is modified by its respective fields or multiple different instructions can be implemented for each of the communication types.
2. Destinations and sources can be explicitly coded into the instruction as an immediate field or referenced by register ID. For instance, for point-to-point communication, the source and destination can be specified directly in the instruction or the register identifiers can specify the locations.
3. The set of registers to be migrated can also be specified as either an immediate field (directly stored in the instruction) or a value in a register, memory location, or specialized hardware structure. Implementation options include a bit vector or register range.
4. The part of each register to be migrated can also be specified as an immediate field or as a reference to one or more registers, memory locations, or specialized hardware structures. Implementation options include using a bit-vector per migrated register as a mask or a single shared mask that is applied to a subset of registers.
5. Preemption/non-preemption can be specified by the instruction opcode but could also appear as an additional field in the instruction or reference the value in a register, memory location, or specialized hardware structures.
6. The offset can be an immediate field or stored in a register.
7. The instruction pointer of choice can be encoded as a reference to a register or an offset from the current instruction pointer, an offset stored in a register, or one or more offsets stored in one or more registers.

In some embodiments, register-based manipulation is combined with the addition of new instructions to the ISA. In one embodiment, control registers are used to hold the characteristics of the migration and a new instruction is used to trigger the migration based on those characteristics. In one embodiment, an instruction is used for specifying more complex types of migrations, whereas registers can be sufficient for simpler types of migration. Examples include hybrid primitives that couple register migration and/or streaming with swizzling, typical ALU primitives such as addition, multiplication, division, population count, shifting, and logical operators such as AND, OR, XOR, and NOT.

In one embodiment, preemptive and/or non-preemptive migration is supported in cases where the migration corresponds to swapping in another thread (i.e., there is already a thread running on the destination core(s) of a migration). In the preemptive case, the currently executing thread in the destination context is preempted and swapped out using prior art techniques for context switching, and the migrated thread is instantiated in its place. In the non-preemptive case, the register contents and architectural state of the migrated context can be queued in memory, in a memory mapped hardware queue, or in a hardware queue manipulated by specialized instructions. When the currently executing thread in the destination context ends or otherwise yields the execution resources, one of the queued contexts can be instantiated in its place and can start execution. In one embodiment, the system does not maintain coherence between the queue storing the queued context state and other memory regions.

In non-preemptive queueing, any of various techniques can be utilized for managing the queue in cases where the queue's initial capacity is exceeded. The queue can be expanded or spill over into cache and marked as a region free of coherence management. The queue can drop a context and require retransmission from the sender. For example, if dropped from the queue, it could be the job of the sender to resend the context, which could be managed in software or hardware. In one embodiment, the sending core is blocked from sending another context when the sending core has more than a fixed number of in-flight requests to prevent queues from overflowing. Various flow control mechanisms can be implemented, including sliding window procedures to acknowledge packets.

Rather than dropping items from the queue, a remote core can also preemptively notify the sender that its queue is getting full. Alternatively, a sender can first ask for permission before sending items. This coordination can prevent the receivers' queues from overflowing. In another embodiment, a credit based scheme is utilized.

In one embodiment, asynchronous and synchronous one-sided communication is utilized for migrating register state (e.g., put register set, get register set). In another embodiment, synchronous two-sided communication is utilized for migrating register state. In this embodiment, sending and receiving compute units block (i.e., wait before proceeding) until a transmission has been sent and validated. For example, following a broadcast, the transmitting compute unit blocks until all receiving compute units acknowledge receipt. This communication paradigm can be used when the communication is synchronous and the migrated registers do not trigger an immediate preemptive thread context switch (e.g., the registers are enqueued and processed later) but communication is synchronous. This communication paradigm can also be used when the registers only replace a subset of a thread's registers.

In a further embodiment, asynchronous two-sided communication is utilized for migrating register state. In this embodiment, transmission and receipt are managed by networking hardware. Senders can initiate the transaction but the CPU can proceed on without waiting. Additionally, in this embodiment, receivers are configured to only check the queue once they are ready.

In one embodiment, fast active messages and remote procedure calls are implemented. For example, rather than having the CPU create the active message, the ISA extensions can allow fast migration to the target execution context by first setting the necessary register state in the source context and then migrating that register state (including the program counter (PC)) to the target execution context. In one embodiment, function arguments are stored in registers, such as when pointers are used in lieu of storing large data objects.

In various embodiments, ISA extensions include control via setting model specific registers, control registers, and the addition of instructions to the ISA. Additional functionality can be layered on top of the ISA extensions via runtime libraries as well as operating system (OS) routines that can be accessed via the system call interface or through one or more handlers that get invoked when the hardware faults on an instruction that makes an illegal request to migrate or access prohibited register state. In one embodiment, an initial system call grants a thread or process the OS capability to migrate registers from a first core to a second core, which is enforced by setting and checking a bit in hardware. Once granted, additional sanctioned migrations would not require OS involvement.

Depending on the embodiment, various techniques can be utilized for a thread to gain permission to migrate registers between cores or other environments. In one embodiment, an access control list is utilized to determine if a thread has permission to migrate registers between cores or other environments. In another embodiment, a control register describes what type of register content can be migrated to and/or from a given execution context. For example, a register can include a bit vector that encodes which cores or execution contexts can migrate register content to and from the current execution context. This register can be saved on context switches along with the other registers.

In a further embodiment, a security certificate is checked in hardware or software to determine if a thread has permission to migrate registers between cores or other environments. In this embodiment, the certificate is granted when the processor switches to privileged mode, which could be invoked on a system call. The value can then be stored in a register or write protected memory location only accessible to the thread while running in privileged mode or when a migration is triggered or validated. The certificate can be stored in a register, memory location, or specialized hardware structure.

In a still further embodiment, the concept of a migration group is utilized to determine if a thread has permission to migrate registers between cores. A core determines whether threads are allowed to migrate registers based on whether they belong to the same migration group. Migration groups can have a core-set and register-set mask and descriptors. The mask and descriptors specify which cores and which registers can be migrated to and from and by whom (e.g. what core and/or what thread(s)). The mask and descriptors can be implemented using a combination of access control lists, per core or per execution context control registers, or any of the aforementioned mechanisms. The masks can be integrated into a single mask or maintained as separate masks. The mask validation process can be accelerated by performing it in hardware rather than in software.

Depending on the embodiment, migration groups can define one-sided or two-sided migration. A subset of threads can send and/or receive information from a subset of other threads. The migration groups can provide support for arbitrary scatter/gather semantics or shuffling semantics. The migration groups can provide a high-level OS abstraction for determining which threads can exchange data. In one embodiment, the migration group semantics are granted via the OS updating memory locations or registers, but migrations and validations can be managed entirely in hardware thereafter.

In a still further embodiment, the system utilizes a limited protection scheme to determine if a thread has permission to migrate registers between cores. In this embodiment, the system lets any thread migrate content to and from other execution contexts provided the other thread is not running in privileged mode or does not have the capability to block.

The various aforementioned schemes can be supported in software by a compiler, interpreter or runtime system by inserting appropriate system calls and migration actions, instructions, or manipulation of register state to cause a migration. Additionally, the schemes can be supported by adding the appropriate wrappers to the system call interface.

In some embodiments, thread migration is utilized for exploiting the higher bandwidth and lower latency provided by private caches. In some cases, a high-end server processor or GPU have more parallelism than can be feasibly exploited by a large class of programs (i.e., the program has insufficient parallelism, insufficient work per thread at large thread counts, or running with fewer threads yields higher performance due to a reduction in contention for the memory subsystem). In these cases, some cores would ordinarily remain idle and lead to wasted resources. Rather than wasting these resources, a system can leverage the additional capacity, high-bandwidth, and low-latency provided by those cores' private caches. For example, one or more prefetching threads can prefetch application thread data to private caches on idle cores. Once prefetched, the application thread then migrates to that core when it needs to operate on that data. The various migration techniques described herein can allow for very fine grain migration and data spreading, allowing a piece of software to fully utilize the private caches regardless of its degree of parallelism.

In various embodiments, system 100 can correspond to any of various types of computer systems or computing devices, including, but not limited to, a personal computer system, desktop computer, laptop or notebook computer, supercomputer, tablet, phone, smartphone, mainframe computer system, handheld computer, workstation, network computer, a consumer device, server, file server, application server, storage server, or in general any type of computing system or device.

Figure 2:
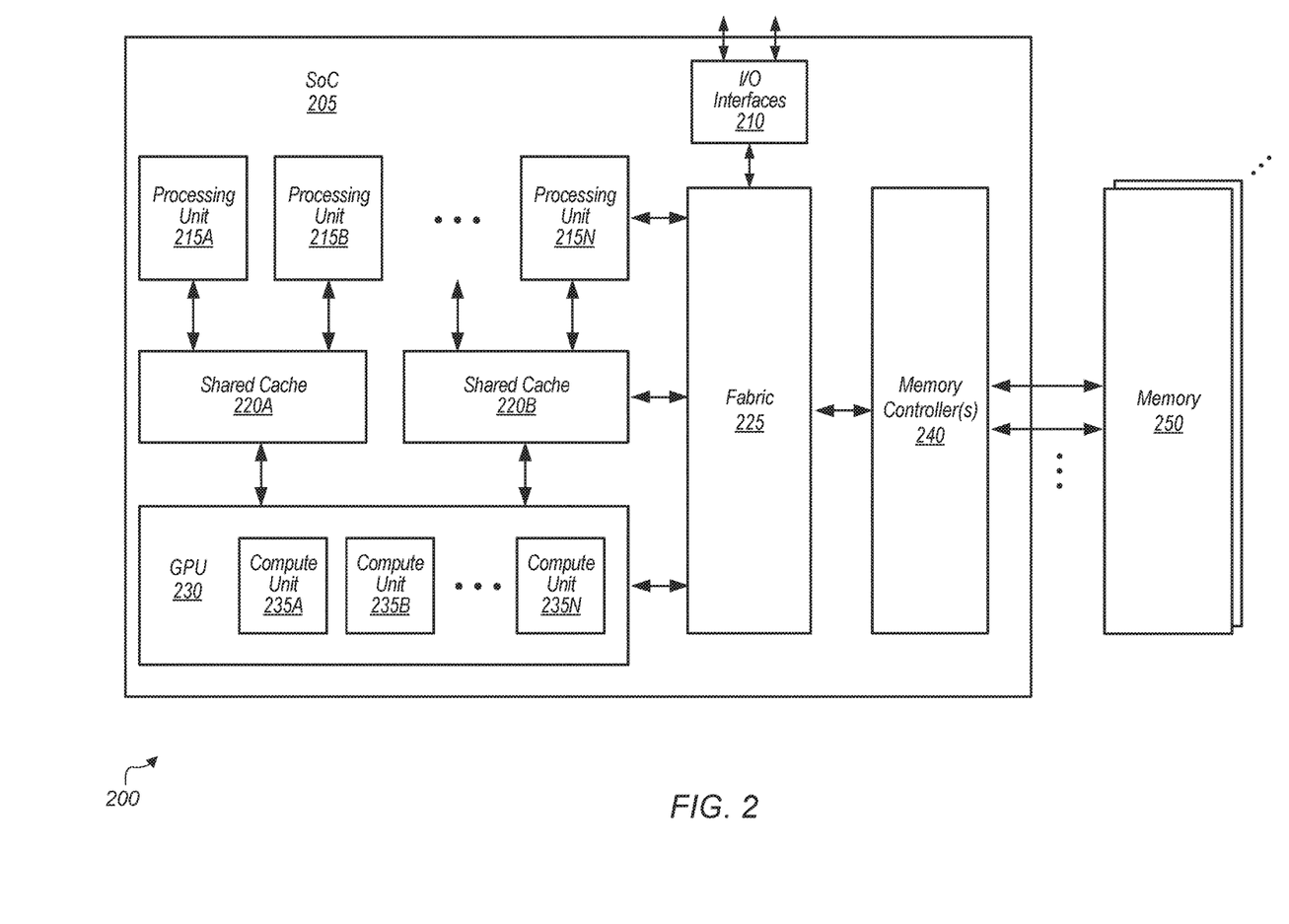
FIG. 2 is a block diagram of another embodiment of a computing system.

Turning now to FIG. 2, a block diagram of another embodiment of a computing system 200 is shown. Computing system 200 is an example of another system which implements instruction set architecture support for migration of an execution context from one or more processing units to one or more other processing units. In one embodiment, computing system 200 includes system on chip (SoC) 205 coupled to memory 250. SoC 205 can also be referred to as an integrated circuit (IC). In one embodiment, SoC 205 includes processing units 215A-N, input/output (I/O) interfaces 210, shared caches 220A-B, fabric 225, graphics processing unit (GPU) 230, and memory controller(s) 240. SoC 205 can also include other components not shown in FIG. 2 to avoid obscuring the figure. Processing units 215A-N are representative of any number and type of processing units. In one embodiment, processing units 215A-N are central processing unit (CPU) cores. In another embodiment, processing units 215A-N are other types of processing units (e.g., application specific integrated circuit (ASIC), field programmable gate array (FPGA), digital signal processor (DSP)). Processing units 215A-N are coupled to shared caches 220A-B and fabric 225.

GPU 230 includes compute units 235A-N which are representative of any number and type of compute units that may be used for graphics or general-purpose processing. It is noted that "compute units" can also be referred to as "processing units" herein. Processing units 215A-N and GPU 230 are configured to execute instructions of a particular instruction set architecture (ISA), which can include operating system instructions and user application instructions. GPU 230 is coupled to shared caches 220A-B and fabric 225. I/O interfaces 210 are coupled to fabric 225. I/O interfaces 210 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 210. Such peripheral devices include (but are not limited to) displays, keyboards, mice, printers, scanners, joysticks or other types of game controllers, media recording devices, external storage devices, network interface cards, and so forth.

In some embodiments, memory 250 includes a plurality of memory modules. Each of the memory modules includes one or more memory devices mounted thereon. In some embodiments, memory 250 includes one or more memory devices mounted on a motherboard or other carrier upon which SoC 205 is also mounted. In one embodiment, memory 250 is used to implement a random access memory (RAM) for use with SoC 205 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 250 includes (but is not limited to) double data rate (DDR) DRAM, DDR2 DRAM, DDR3 DRAM, and so forth.

Although not explicitly shown in FIG. 2, SoC 205 can also include one or more cache memories that are internal to the processing units 215A-N and compute units 235A-N. In some embodiments, SoC 205 includes shared caches 220A-B that are utilized by processing units 215A-N and compute units 235A-N. In one embodiment, caches 220A-B are part of a cache subsystem including a cache controller.

In various embodiments, computing system 200 can be a computer, laptop, mobile device, server, web server, cloud computing server, storage system, or any of various other types of computing systems or devices. It is noted that the number of components of computing system 200 and/or SoC 205 can vary from embodiment to embodiment. There can be more or fewer of each component/subcomponent than the number shown in FIG. 2. For example, in another embodiment, SoC 205 can include multiple memory controllers coupled to multiple memories. It is also noted that computing system 200 and/or SoC 205 can include other components not shown in FIG. 2. Additionally, in other embodiments, computing system 200 and SoC 205 can be structured in other ways than shown in FIG. 2.

Figure 3:
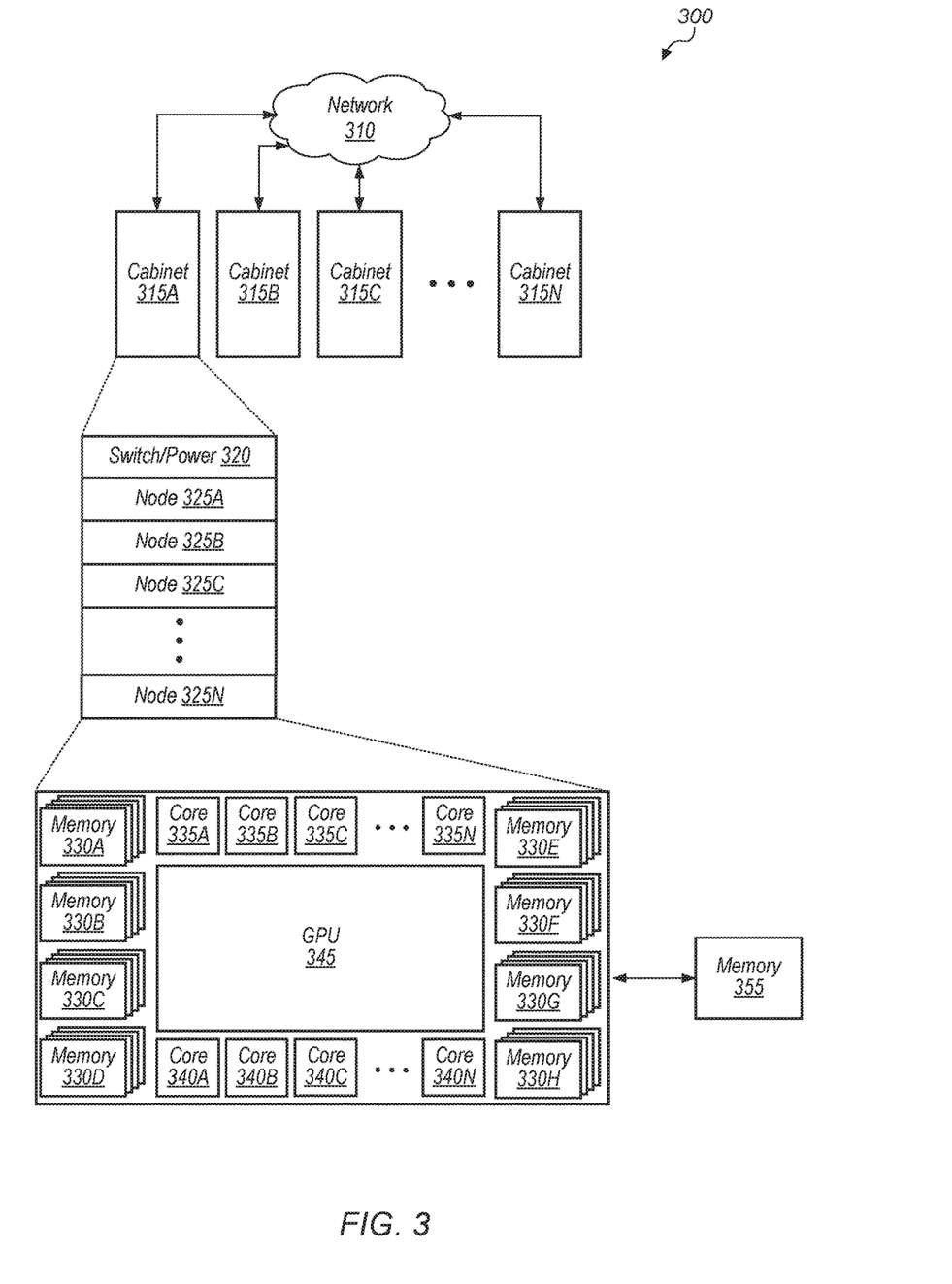
FIG. 3 is a block diagram of another embodiment of a computing system.

Referring now to FIG. 3, a block diagram illustrating another embodiment of a computing system 300 is shown. Computing system 300 is an example of another system which can implement the various instruction set architecture and other software techniques described herein for migrating an execution context from one or more processing units to one or more other processing units. As shown in FIG. 3, system 300 includes network 310 and cabinets 315A-N. Each cabinet of cabinets 315A-N includes a plurality of nodes. In various embodiments, system 300 is utilized to process and store data, perform computational tasks, and transmit data to other devices and systems using network 310 or another network. In one embodiment, system 300 performs data processing on large datasets. For example, system 300 can be configured to execute any of various types of workloads (e.g., parallel processing applications, MapReduce operations, simulations, modeling applications) depending on the embodiment. It is noted that system 300 can also be referred to as a supercomputer, data center, cluster, high performance computing (HPC) cluster, or cloud computing cluster.

In various embodiments, network 310 can include any number and type of networks (e.g., local area network (LAN), wide area network (WAN), wireless networks, an Intranet, the Internet, storage area network (SAN)). Examples of LANs include Ethernet networks, Fiber Distributed Data Interface (FDDI) networks, and token ring networks. Network 310 can also represent any type of wired or wireless connection medium. For example, wired mediums can include Ethernet, fiber channel, etc. Wireless connection mediums can include a wireless connection using a wireless communication protocol such as IEEE 802.11, a modem link through a cellular service, a satellite link, etc.

As shown in FIG. 3, cabinet 315A includes switch/power unit 320 and nodes 325A-N, which are representative of any number and type of nodes. Generally speaking, a node can be defined as an apparatus or system with at least one computing/processing element (e.g., processor, processor core, programmable logic device, application specific integrated circuit) and at least one memory device. The at least one computing element of the node is configured to execute instructions and/or perform one or more types of computations (e.g., floating point, integer, memory, I/O) depending on the embodiment. Node 325N is shown with an expanded view in FIG. 3 to illustrate one example of a node which can be utilized in system 300. In other embodiments, other types of nodes with other numbers and types of processing elements and memory devices can be utilized.

In one embodiment, the nodes within each cabinet 315A-N are interconnected to one another through a switch (e.g., switch/power unit 320) and the cabinets 315A-N within system 300 can also be interconnected through a switch (not shown). The switch/power unit 320 can also be configured to provide power to the nodes of cabinet 315A. Alternatively, in another embodiment, there can be separate switch and power units, with power being provided to nodes 325A-N via a backplane or other mechanism. In some embodiments, there can be multiple switches and/or power units per cabinet.

In one embodiment, node 325N includes cores 335A-N, cores 340A-N, GPU 345, and memories 330A-H, which are representative of any number and type of memory devices. The components of node 325N can be interconnected by one or more communication buses. Cores 335A-N and cores 340A-N are representative of any number and any type of processing element (e.g., CPU, processor core, APU) and can be coupled to GPU 345. Cores 335A-N and cores 340A-N can have any number and type of caches (e.g., L1 cache, L2 cache). Cores 335A-N, cores 340A-N, and GPU 345 can be configured to execute instructions concurrently. In one embodiment, cores 335A-N, cores 340A-N, and GPU 345 can share a virtual address space.

Various types of memories 330A-H can be utilized in system 300, including random-access memory (RAM), static RAM (SRAM), dynamic RAM (DRAM), high-density DRAM, eDRAM, 3D stacked memory (e.g., stacked DRAM), interposer-based integrated memory, off-chip DRAM on a motherboard, non-volatile RAM (NVRAM), magneto-optical storage medium, read only memory (ROM), synchronous DRAM (SDRAM), double data rate SDRAM (DDR SDRAM), phase-change memory, spin-transfer torque magnetic RAM, memristor, extended data output (EDO) RAM, Rambus RAM, Rambus DRAM, erasable programmable memory (EEPROM), solid-state memory, hard disk drive, optical storage mediums, etc. In one embodiment, memories 330A-H can be DRAMs. Node 325N is also coupled to memory 355, which can be a NVRAM in one embodiment. In various embodiments, the memories 330A-H can store application software, communication libraries, operating system software, and/or other software and data.

In one embodiment, node 325N includes a vertical die stack of memory die with memories 330A-H and processor die with cores 335A-N, cores 340A-N, and GPU 345. The memory die can include a stacked memory device where the stacked die implement memory circuitry, such as DRAM, SRAM, ROM, and the like. The processor die can implement hard-wired logic and routing logic for accessing the memory circuitry of the stacked memory die. In various embodiments, node 325N can be fabricated using any of a variety of 3D integrated circuit fabrication processes. It is noted that in other embodiments, other configurations and structures of nodes can be utilized for nodes 325A-N.

Figure 4:
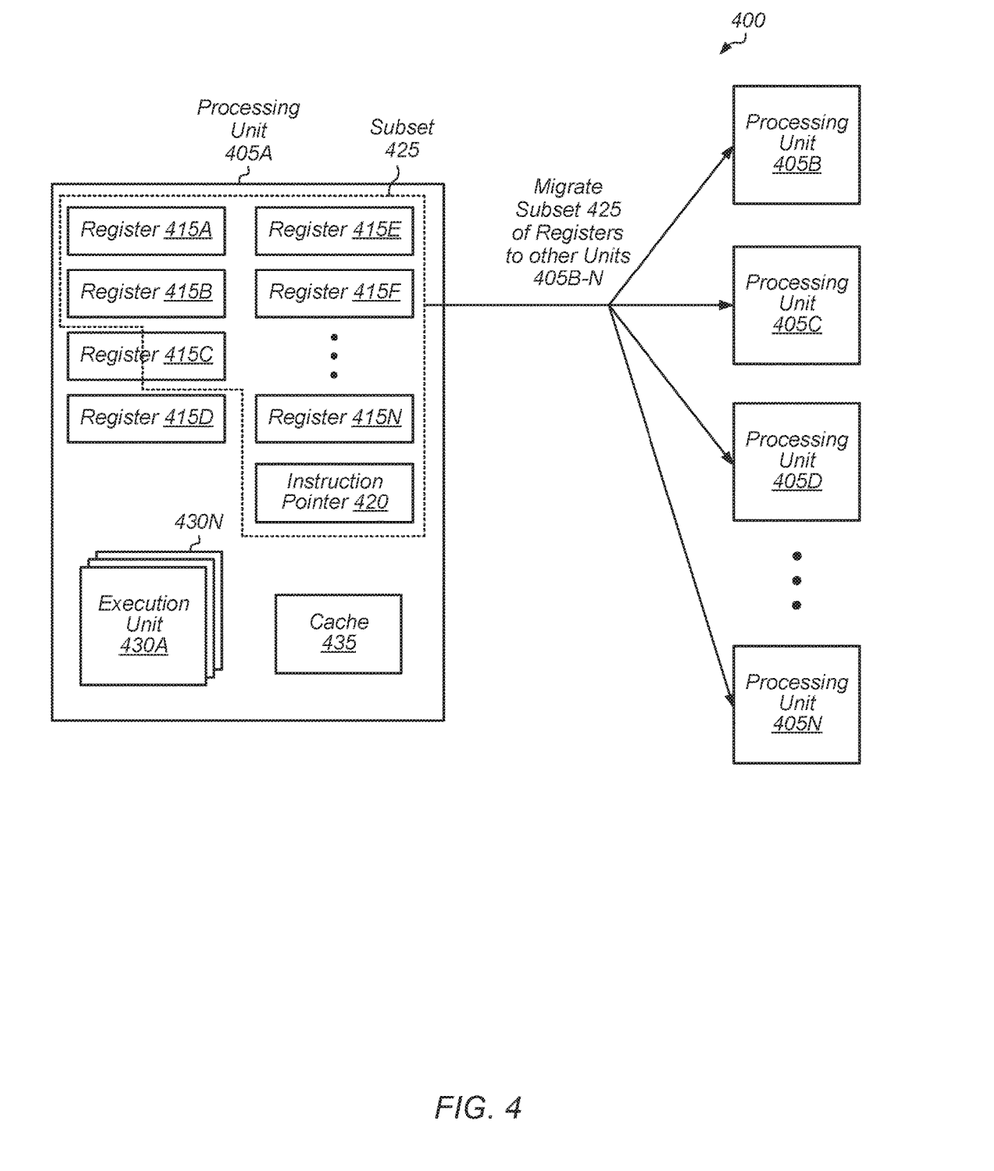
FIG. 4 is a block diagram of one embodiment of a system with a plurality of processing units.

Turning now to FIG. 4, a block diagram of one embodiment of a system 400 with a plurality of processing units 405A-N is shown. The system 400 includes processing units 405A-N, which are representative of any number and type of processing units. Processing unit 405A is expanded to show its contents in accordance with one possible embodiment. In one embodiment, processing unit 405A includes registers 415A-N, instruction pointer 420, cache 435, and execution units 430A-N. Processing unit 405A can also include other components which are not shown in FIG. 4 to avoid obscuring the figure. In one embodiment, registers 415A-N and instruction pointer 420 are representative of the execution context. Processing unit 405A is coupled to a plurality of other processing units 405B-N. Processing units 405B-N are representative of any number and type of processing units. The links between processing units 405A and processing units 405B-N can utilize any type of connection, depending on the embodiment.

In one embodiment, processing unit 405A executes an instruction that causes a subset 425 of registers 415A-N to be migrated to one or more other processing units 405B-N. The subset 425 of registers 415A-N can include a portion of the registers 415A-N as well as a portion of the bits of the selected registers. In one embodiment, the subset 425 of registers 415A-N to migrate is specified as part of the instruction that causes the migration. In another embodiment, the subset 425 of registers 415A-N to migrate is specified in one of registers 415A-N or in one or more separate control registers (not shown). The instruction pointer 420 of processing unit 405A can also be migrated as part of the subset of registers 415A-N. In one embodiment, an offset is added to the value of instruction pointer 420 before being sent to the other processing units 405B-N.

In one embodiment, the migration is a preemptive migration, where the existing context of the destination processing unit is preempted by the register state of processing unit 405A. In one embodiment, the instruction that executed to cause the migration specifies that the migration is a preemptive migration. For preemptive migration, the existing thread executing on the destination processing unit are interrupted and its registers and architectural state saved, and then the registers of processing unit 405A are used to start the migrated thread on the destination processing unit. In another embodiment, the migration is a non-preemptive migration. In this embodiment, the registers of processing unit 405A are stored in memory and the destination processing unit can wait before switching the execution context.

Accordingly, the destination processing unit continues executing its current thread and then wait until some event triggers the migrated register state to be copied into its state registers, and then the migrated thread can be launched.

Figure 5:
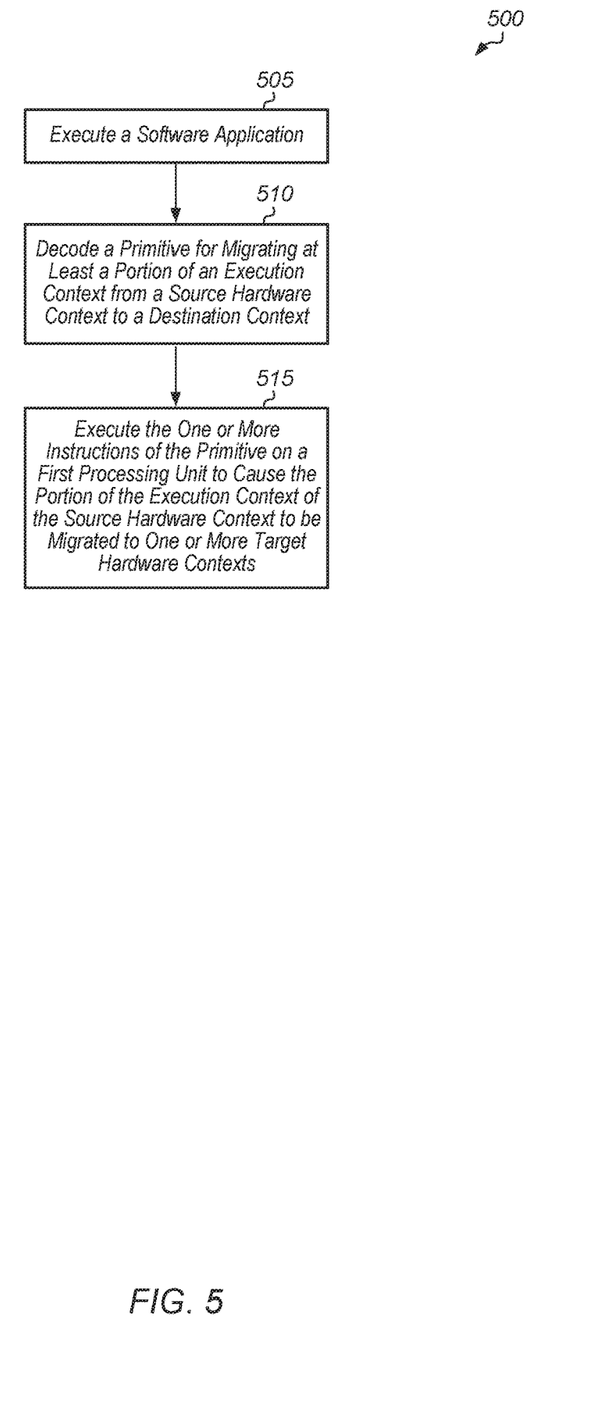
FIG. 5 is a generalized flow diagram illustrating one embodiment of a method for migrating an execution context.

Referring now to FIG. 5, one embodiment of a method 500 for migrating an execution context is shown. For purposes of discussion, the steps in this embodiment and those of FIGS. 6-9 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A system executes a software application (block 505). In one embodiment, the system includes a plurality of processing units and a plurality of memory devices. The system decodes, within the software application, a primitive for migrating at least a portion of an execution context from a source hardware context to one or more target hardware contexts (block 510). In one embodiment, the execution context includes a plurality of registers of the source processing unit. The plurality of registers can include an instruction pointer value. In one embodiment, the primitive includes one or more instructions which are executed by a given processing unit. In one embodiment, the source hardware context and the one or more target hardware contexts are within the same processing unit. In another embodiment, the source hardware context is in a first processing unit and the one or more target hardware contexts are in a second processing unit, a third processing unit, and so on. As used herein, the term "hardware context" can be defined as the physical and/or virtual resources of a processing unit that hold the architectural state of a thread executing on that processing unit. A hardware context can correspond to a thread executing on a processor core of a CPU, a virtual CPU (vCPU), a compute unit of a GPU, an FPGA, ASIC, DSP, and so on.

Next, the system executes the one or more instructions of the primitive on the source hardware context to cause the portion of the execution context of the source hardware context to be migrated to one or more target hardware contexts (block 515). An offset can also be applied to the instruction pointer value which is migrated with the execution context in block 515. After block 515, method 500 ends.

Figure 6:
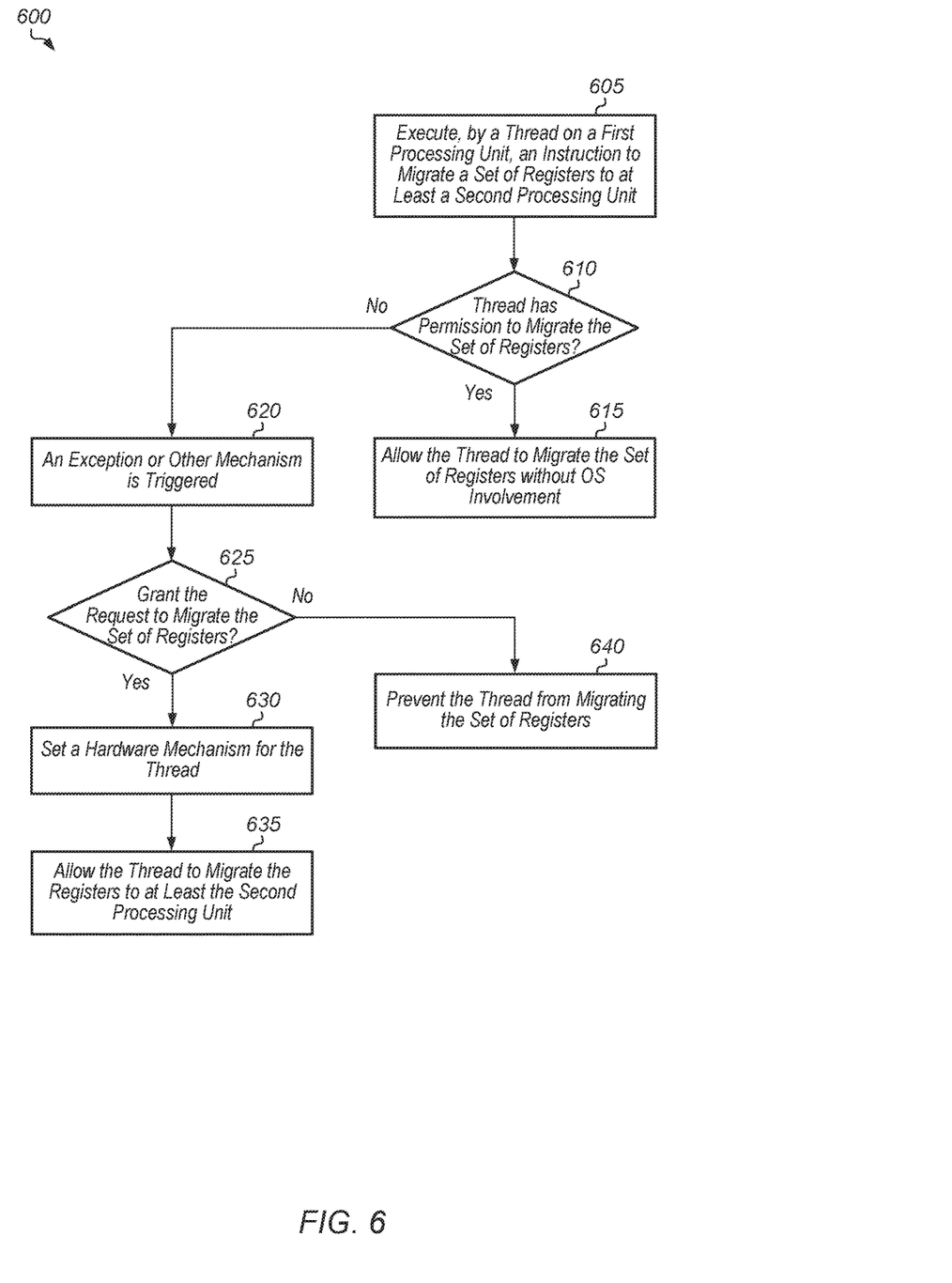
FIG. 6 is a generalized flow diagram illustrating one embodiment of a method for migrating registers.

Turning now to FIG. 6, one embodiment of a method 600 for migrating registers is shown. A thread on a first processing unit executes an instruction to migrate a set of registers to at least a second processing unit (block 605). The first processing unit checks a hardware indicator to see if the thread has previously been granted permission to migrate the set of registers (conditional block 610). If the thread has been previously granted the authorization to migrate registers (conditional block 610, "yes" leg), then the thread is allowed to migrate the set of registers without operating system (OS) involvement (block 615). If the thread has not previously been granted the authorization to migrate registers (conditional block 610, "no" leg), then an exception or other mechanism is triggered (block 620). The OS then determines whether to grant the request to migrate the set of registers (conditional block 625).

In one embodiment, the OS utilizes an access control list to determine if the thread or processing unit has permission to migrate the set of registers. In one embodiment, a certificate could be stored in a register, memory location, or specialized hardware structure for tracking access control lists. In another embodiment, the content of a control register describes what type of register content can be migrated to and/or from the set of registers. In this embodiment, a register contains a bit vector or other representation that encodes which cores or execution contexts are allowed to migrate register content to and from the current core or execution context. The register can also specify what subset of each register is allowed to be migrated. The register can be saved on context switches along with the other registers. In a further embodiment, a security certificate is checked in hardware or software to determine if the set of registers should be migrated. In a still further embodiment, the OS allows the register migration if the source processing unit and the destination processing unit belong to the same migration group. In this embodiment, migration groups have a core-set and register-set mask and descriptors. The mask and descriptors can specify which cores and which registers could be migrated to and from and by whom (e.g., what core and/or what thread(s)). In a still further embodiment, the OS lets any thread migrate content to and from other execution contexts provided the other thread is not running in privileged mode or does not have the capability to block.

If the OS grants the request to migrate the set of registers (conditional block 625, "yes" leg), then a hardware mechanism is set for the thread (block 630). Then, the thread is allowed to migrate the set of registers to at least the second processing unit (block 635). If the OS determines not to grant the request to migrate the set of registers (conditional block 625, "no" leg), then the OS prevents the thread from migrating the set of registers (block 640). After blocks 615, 635 and 640, method 600 ends.

Figure 7:
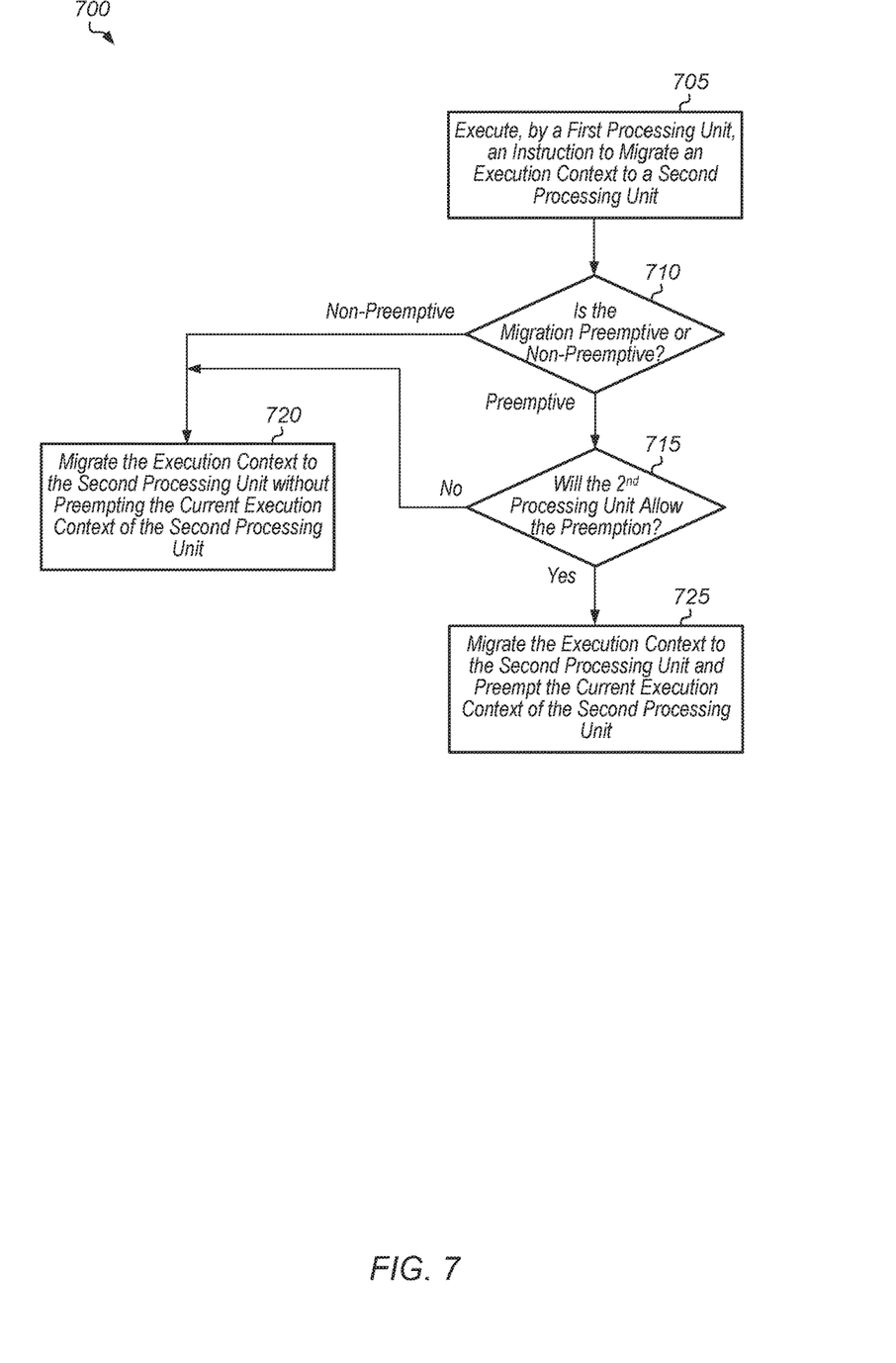
FIG. 7 is a generalized flow diagram illustrating one embodiment of a method for performing preemptive or non-preemptive migration.

Referring now to FIG. 7, one embodiment of a method 700 for performing preemptive or non-preemptive migration is shown. A first processing unit executes an instruction to migrate an execution context (or at least a portion thereof) to a second processing unit (block 705). When executing the instruction, the first processing unit determines if the migration is preemptive or non-preemptive (conditional block 710). In one embodiment, the migration is specified as primitive or non-preemptive in the instruction. In another embodiment, the migration is specified as preemptive or non-preemptive in one or more bits of a register. In other embodiments, the migration is specified as preemptive or non-preemptive using other mechanisms.

If the migration is specified as preemptive (conditional block 710, "preemptive" leg), then the second processing unit determines whether to allow the preemptive migration from the first processing unit (conditional block 715). If the migration is specified as non-preemptive (conditional block 710, "no" leg), the execution context is migrated to the second processing unit without preempting the current execution context of the second processing unit (block 720). In one embodiment, non-preemptive migration of the execution context involves writing multiple register values to memory locations which are not part of the second processing unit's execution context.

If the second processing unit determines preemptive migration from the first processing unit is allowed (conditional block 715, "yes" leg), the execution context is migrated to the second processing unit and preempts the current execution context of the second processing unit (block 725). In one embodiment, preemptive migration of the execution context involves over-writing register values of the second processing unit's execution context with the register values from the first processing unit's execution context. If the second processing unit determines preemptive migration from the first processing unit is not allowed (conditional block 715, "no" leg), then the execution context is migrated to the second processing unit without preempting the current execution context of the second processing unit (block 720). After blocks 720 and 725, method 700 ends.

Figure 8:
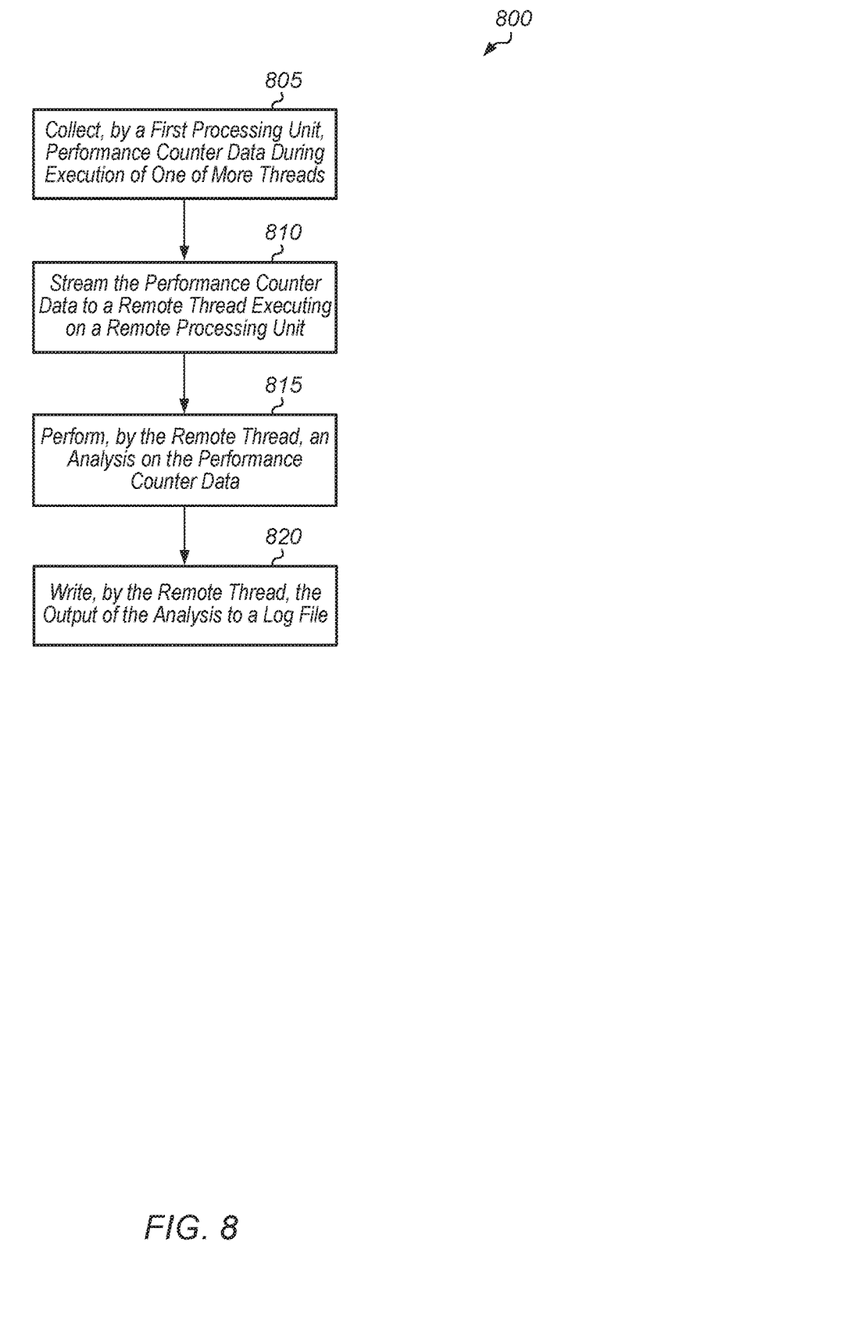
FIG. 8 is a generalized flow diagram illustrating one embodiment of a method for migrating performance counter data to a remote thread.

Turning now to FIG. 8, one embodiment of a method 800 for migrating performance counter data to a remote thread is shown. A first processing unit collects performance counter data during execution of one or more threads (block 805). Next, the first processing unit streams the performance counter data to a remote thread executing on a remote processing unit (block 810) by using the context migration mechanisms of this invention to periodically copy a subset of the first processing unit's registers that contain performance counter data to the remote processing unit's registers. In one embodiment, the copying of the registers may occur anytime one or more of the subset of the first processing unit's registers are modified. Then, the remote thread performs an analysis on the performance counter data (block 815). Next, the remote thread writes the output of the analysis to a log file (block 820). In one embodiment, the analysis by the remote thread may be used to effect modifications to the execution of the first processing unit in addition to, or instead of, outputting the analysis to a log file. After block 820, method 800 ends.

Figure 9:
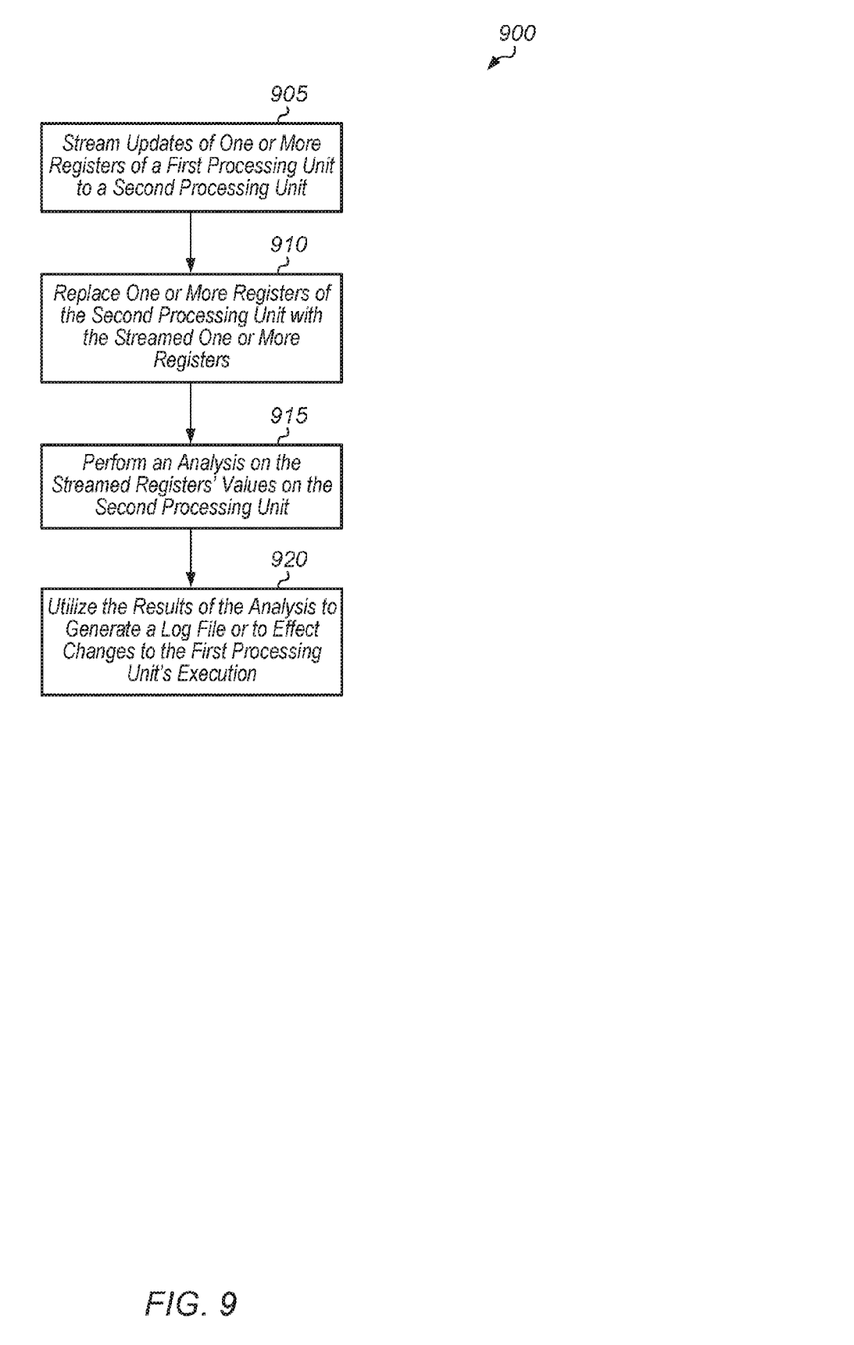
FIG. 9 is a generalized flow diagram illustrating one embodiment of a method for streaming registers between processing units.

Referring now to FIG. 9, one embodiment of a method 900 for streaming registers between processing units is shown. Updates to one or more registers of a first processing unit are streamed to a second processing unit (block 905). The one or more registers can also be streamed to one or more other processing units in some embodiments. Next, one or more registers of the second processing unit are replaced with the streamed one or more registers responsive to the second processing unit receiving the streamed one or more registers (block 910). Then, an analysis is performed on the streamed registers' values on the second processing unit (block 915). Next, the results of the analysis are utilized to generate a log file or to effect changes to the first processing unit's execution (block 920). After block 920, method 900 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
one or more processing units; and
one or more memory devices;
wherein the system is configured to:
execute a software application stored on a memory device of the one or more memory devices;
decode, within the software application, a primitive for migrating at least a portion of an execution context from a source hardware context of a processing unit of the one or more processing units to one or more target hardware contexts, wherein the primitive comprises one or more instructions; and
execute the one or more instructions of the primitive on the source hardware context to cause the portion of the execution context of the source hardware context to be migrated to one or more target hardware contexts.

2. The system as recited in claim 1, wherein each execution context comprises a plurality of registers.

3. The system as recited in claim 1, wherein the system is further configured to:
determine if the portion of the execution context is allowed to be migrated from the source hardware context to the one or more target hardware contexts; and
prevent the portion of the execution context from being migrated to a given target hardware context responsive to determining the portion of the execution context does not have permission to be migrated to the given target hardware context.

4. The system as recited in claim 2, wherein the primitive includes an indication of which subset of the registers of the execution context from the source hardware context are to be migrated.

5. The system as recited in claim 2, wherein the primitive includes an indication of the portion of each register of the execution context from the source hardware context to be migrated.

6. The system as recited in claim 1, wherein:
the primitive includes an indication specifying whether a migration is preemptive or non-preemptive,
preemptive migration causes a context switch at each of the one or more target hardware contexts between an existing execution context and a migrated execution context, and
non-preemptive migration involves queueing the migrated execution context in memory.

7. The system as recited in claim 1, wherein the primitive specifies if a migration is a unicast, multicast, or broadcast migration via the specification of one or more destination contexts or a special encoding that indicates a migration to all available hardware contexts.

8. The system as recited in claim 1, wherein the primitive specifies whether asynchronous or synchronous communication is utilized for migrating the portion of the execution context.

9. The system as recited in claim 1, wherein migration of the portion of the execution context occurs within a single processing unit.

10. The system as recited in claim 1, wherein migration of the portion of the execution context occurs across two or more processing units.

11. A method comprising:
executing a software application;
decoding, within the software application, a primitive for migrating at least a portion of an execution context from a source hardware context to one or more target hardware contexts, wherein the primitive comprises one or more instructions; and
executing the one or more instructions of the primitive on the source hardware context to cause the portion of the execution context of the source hardware context to be migrated to one or more target hardware contexts.

12. The method as recited in claim 11, wherein each execution context comprises a plurality of registers.

13. The method as recited in claim 11, further comprising:

determining if the portion of the execution context is allowed to be migrated from the source hardware context to the one or more target hardware contexts; and preventing the portion of the execution context from being migrated to a given target hardware context responsive to determining the portion of the execution context does not have permission to be migrated to the given target hardware context.

14. The method as recited in claim 12, wherein the primitive includes an indication of which subset of the registers of the execution context from the source hardware context are to be migrated.

15. The method as recited in claim 12, wherein the primitive includes an indication of the portion of each register of the execution context from the source hardware context to be migrated.

16. The method as recited in claim 11, wherein:

the primitive includes an indication specifying whether a migration is preemptive or non-preemptive, preemptive migration causes a context switch at each of the one or more target hardware contexts between an existing execution context and a migrated execution context, and non-preemptive migration involves queueing the migrated execution context in memory.

17. The method as recited in claim 11, wherein the primitive specifies if a migration is a unicast, multicast, or broadcast migration via the specification of one or more destination contexts or a special encoding that indicates a migration to all available hardware contexts.

18. The method as recited in claim 11, wherein the primitive specifies whether asynchronous or synchronous communication is utilized for migrating the portion of the execution context.

19. A method comprising:

streaming updates to one or more registers of a first processing unit to a second processing unit; and replacing one or more registers of the second processing unit with the streamed one or more registers.

20. The method as recited in claim 19, further comprising the second processing unit performing analysis on the streamed registers' values and utilizing the results of the analysis to generate a log file or to effect changes to the first processing unit's execution.

\* \* \* \* \*